Nov. 10, 1959 R. L. ASHENHURST ET AL 2,912,677

ELECTRICAL CIRCUITS EMPLOYING SENSING WIRES
THREADING MAGNETIC CORE MEMORY ELEMENTS

Filed Dec. 31, 1953 5 Sheets-Sheet 1

INVENTORS: R. L. ASHENHURST
R. C. MINNICK

BY [signature]

ATTORNEY

INVENTORS: R. L. ASHENHURST
R. C. MINNICK
BY James W. Falk
ATTORNEY

INVENTORS: R. L. ASHENHURST
R. C. MINNICK

BY [signature]
ATTORNEY

INVENTORS: R. L. ASHENHURST
R. C. MINNICK
BY [signature]
ATTORNEY

INVENTORS: R.L. ASHENHURST
R.C. MINNICK
BY
[signature]
ATTORNEY

United States Patent Office 2,912,677
Patented Nov. 10, 1959

2,912,677

ELECTRICAL CIRCUITS EMPLOYING SENSING WIRES THREADING MAGNETIC CORE MEMORY ELEMENTS

Robert L. Ashenhurst and Robert C. Minnick, Cambridge, Mass., assignors to Bell Telephone Laboratories, Incorporated, New York, N.Y., a corporation of New York Application December 31, 1953, Serial No. 401,465

15 Claims. (Cl. 340—174)

This invention relates to electrical circuits and more particularly to such circuits employing magnetic cores as memory or storage elements.

It is a general object of this invention to provide improved magnetic core circuits.

It is a more specific object of this invention to provide an improved magnetic core structure that is simple, economical, compact, and which lends itself readily to employment in matrices or other circuit configurations employing a large number of such cores mounted in an ordered array.

It is another object of this invention to prevent erroneous output signals on the sensing of information stored in a particular core in an array due to the prior disturbing effects applied to that core on the storing or sensing of information in other cores in the array.

In one specific illustrative embodiment of this invention, described in detail below, the magnetic cores of a magnetic core matrix are produced by providing a plurality of apertures or holes through a sheet of magnetic material, the magnetic material encompassing each aperture or hole being the material of the core in which information may be stored. These cores may be thus defined by holes drilled or otherwise formed in any magnetic material having the desired substantially rectangular hysteresis loop utilized for the storage of information, the types of hysteresis loops and particular materials being well known in the art. Magnetic cores thus defined by holes may replace the prior art toroids in various types of circuits wherein toroids have priorly been employed and, thus, wherever in the prior art magnetic cores have been referred to it is to be understood now that those cores may be either of the prior toroid type or of the hole type of this invention. In effect, therefore, the invention expands the definition of the prior art term magnetic core to include a structure not known to the prior art.

In this specific illustrative embodiment, twenty-five holes are drilled through the material which thus defines a magnetic core matrix of twenty-five cores. In accordance with another aspect of the invention each hole is threaded by a number of wires employed for storing and sensing information in that core; in the specific embodiment described below four such sensing wires are employed and each wire has applied to it for sensing a current pulse one-fourth the total sensing current desired, thereby reducing erroneous signals appearing on the single output wire threading all cores due to the presence of disturbing fields generated at other cores than the selected one, to the point where their effects are negligible.

It is therefore a feature of this invention that a magnetic core circuit comprise a plate member of magnetic material having a rectangular hysteresis characteristic for the storing and sensing of information and that that plate have a plurality of holes therethrough each defining a magnetic core, and wires extending through each of the holes and cooperating with the magnetic material encompassing each hole for the storage and sensing of information.

It is a further feature of this invention wherein a plurality of magnetic cores are arranged in an array, that each core in the array be threaded by a plurality of wires and that means be provided for applying to each wire equal current pulses of like sign, each current pulse being a portion of the total sensing current desired depending on the number of wires threading each hole.

It is a still further feature of this invention that there be wires from at least three distinct groups threading each core member in an array and that no two wires of any group thread more than one core in common. Specifically it is a feature of this invention that the wires threading any core be specified in mathematical terms and the relationship between these wires be specified to assure that no two wires threading any one core thread any other core in common.

It is a still further feature of this invention that the wires threading the cores be specified such that when the cores are defined by a hole through a sheet of magnetic material each wire enters each hole in the proper direction so that the effects of the passage of the positive current through all the wires are additive.

A complete understanding of this invention and of these and other features thereof may be gained from the following detailed description and the accompanying drawing, in which:

Fig. 1 is a plan view of a magnetic core matrix structure in accordance with one specific illustrative embodiment of this invention, a portion of the insulating cover of the structure being broken away to show the sheet of magnetic material; in this figure the wires are shown explicitly to facilitate a grasp of the structure even though in fact they are above the insulating cover which has been broken away;

Figure 1:
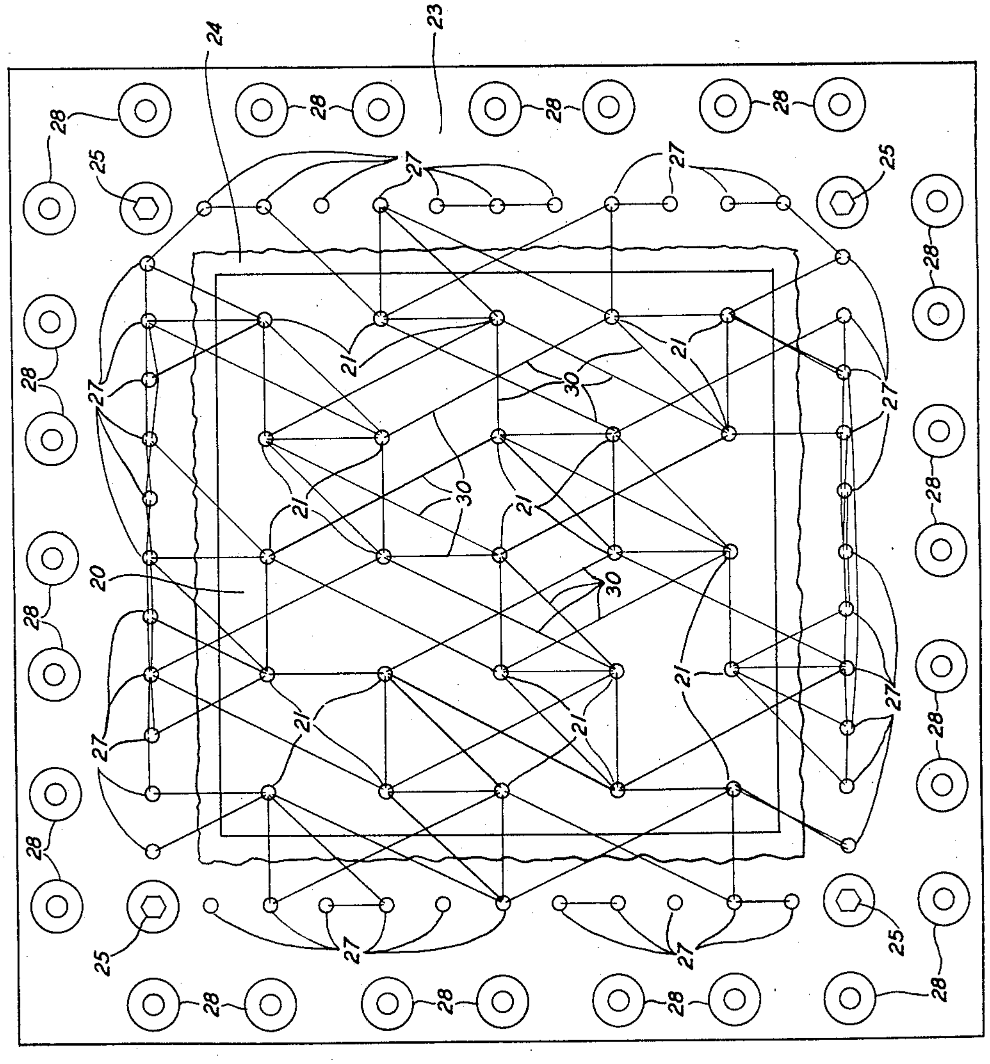
Figure 7A:
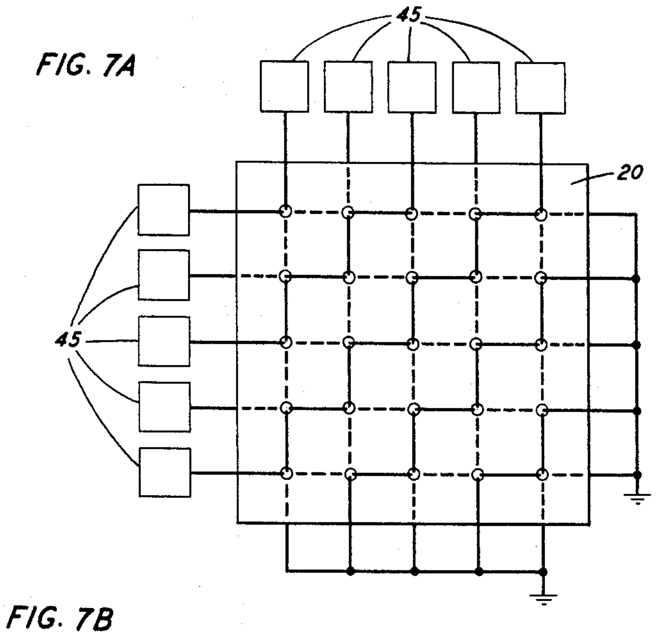
Figure 7B:
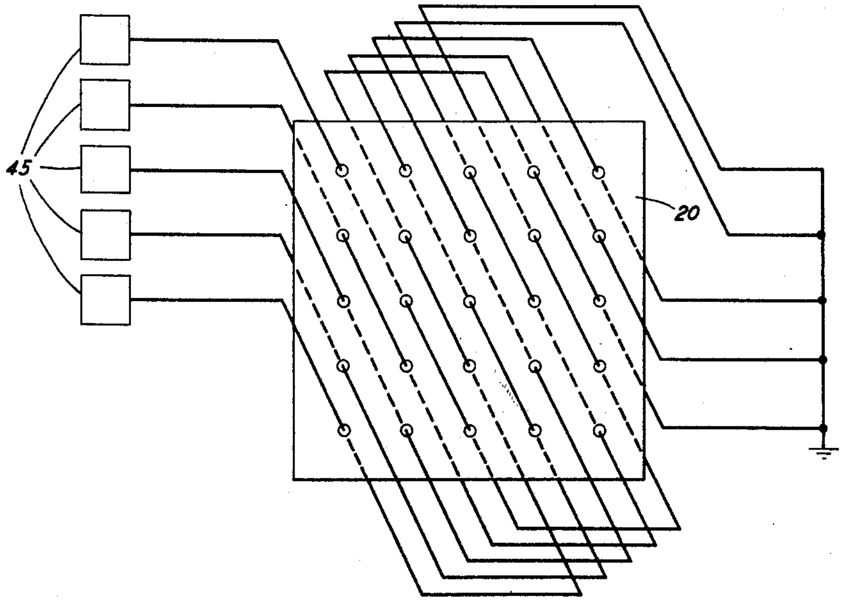
Figure 7D:
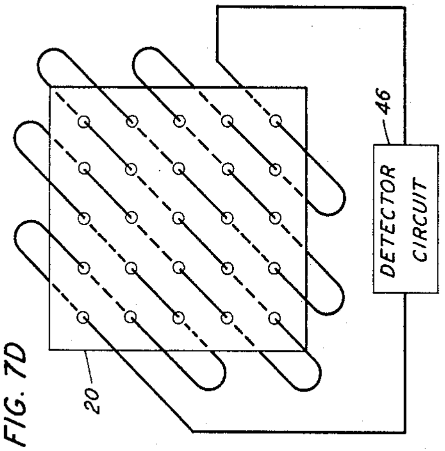
Figure 7C:
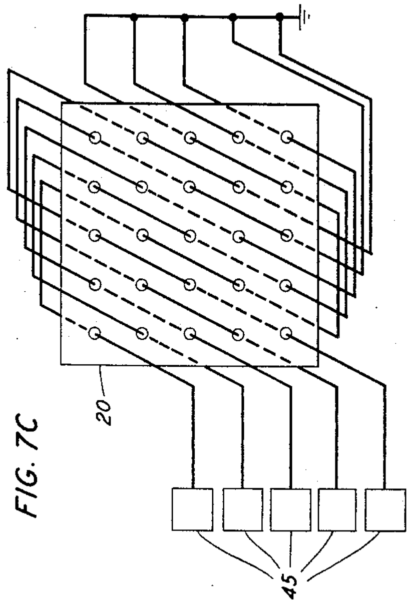
Figure 8:
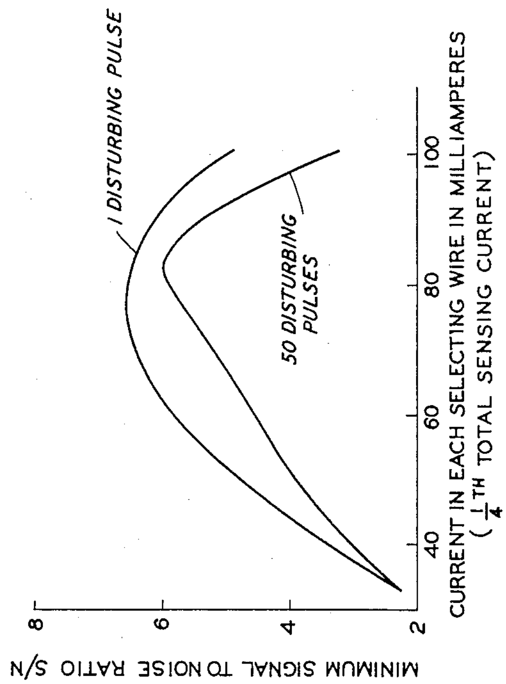

Figs. 7A, B, C, and D are simplified wiring and circuit diagrams of the wiring of the embodiment of Fig. 1; and Fig. 8 is a graph of the signal to noise ratio for the embodiment of Fig. 7 for different sensing currents and two different conditions of the core due to disturbing pulses.

Turning now to Fig. 1, there is shown a plan view of one specific illustrative embodiment of our invention, the top cover member being shown partially broken away but all the wires being shown as viewed from above the cover member. As can be seen, a substantially square plate 20 of a magnetic material is pierced by a plurality of holes or apertures 21. In accordance with an aspect of the invention each hole 21 in the magnetic plate 20 defines a magnetic core. Actually it is more precise to speak of the magnetic material encompassing each hole as defining the core, but as it is understood that the storage of information is effected by the magnetization of the material encompassing the hole, it will facilitate the subsequent discussion of the threading of the wires through the holes if we merely refer to the holes themselves as individual magnetic cores.

The magnetic plate 20 is held in position between two sheets 23 and 24 of insulating material, the plate being tightly pressed between these sheets to prevent motion thereof by bolts or screws 25. The sheets 23 and 24 have apertures therein mating with the holes 21 and additionally a number of peripheral apertures 27 whose purpose will be described below with reference to the wiring of the specific array of this embodiment. A number of terminal pins 28 are mounted on the upper insulating sheet 23 and provide facile connections between the various individual wires of the array and the external circuitry.

In the specific embodiment depicted of an $n$ x $n$ array of magnetic core holes, $n$ was five and thus the embodiment comprises a matrix system for the storage of twenty-five binary digits. Storage and read-out in these binary digits is effected by a plurality of wires, generally designated by the numeral 30 in this figure. These wires thread through the individual holes 21 in predetermined patterns or paths, in accordance with other aspects of this invention as further described below and particularly with reference to Figs. 7A, 7B, 7C, and 7D.

In one particular embodiment of this invention in accordance with Fig. 1 the magnetic plate 20 was a 2 inch x 2 inch sheet of 0.0005 inch 4–79 molybdenum Permalloy and it was mounted between two sheets 23 and 24 of Bakelite. The twenty-five holes 21 were each 0.0625 inch in diameter and were spaced 0.3937 inch between centers; as mentioned above these holes were drilled through both the magnetic plate 20 and the Bakelite sheets 23 and 24. The size of the holes 27 is not important but they were also 0.0625 inch in diameter.

Before describing the manner in which the wires 30 thread the holes 21 in accordance with aspects of this invention and the operation of the specific illustrative embodiment of Fig. 1, it may be advisable to review in a general manner the operation of magnetic cores and certain of the disadvantages of the prior art structures.

Figure 2:
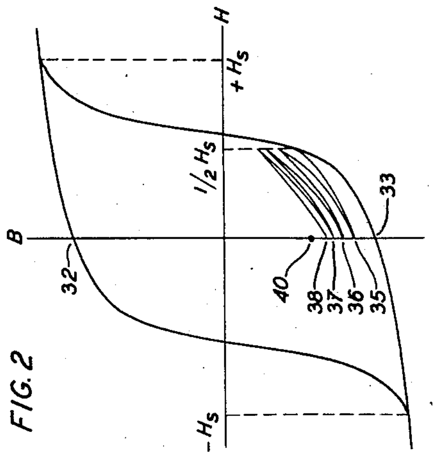
Figs. 2 and 3 are hysteresis loops characteristic of the materials employable for magnetic cores.

Basically a magnetic core storage system comprises a core of ferromagnetic material having a substantially rectangular hysteresis loop and an input and an output winding around or through this core. When a positive potential is applied to the input winding the resulting current tends to magnetize the core in one direction, which we shall assume to be clockwise. When the applied potential is negative, the magnetization tends to be counterclockwise. If these currents are sufficiently large and of a sufficient duration to deliver sufficient energy, the core will always be driven to a saturation in one direction or the other, and may therefore be treated as a two-state device. Such a hysteresis loop is depicted in Fig. 2 wherein the magnetization fields due to the application of the positive and negative currents are indicated by $+H_s$ and $-H_s$, both fields being sufficiently large to attain saturation of the core.

To read out information stored in the core, a potential of fixed polarity, say positive, is applied to the input winding. If the core has been left at state 32 by a positive pulse applying force $+H_s$ to the core, this will cause little change in flux and the voltage induced across the output winding will be small. However, if the core is originally at point 33 on the hysteresis loop, the change in flux in traversing the loop to point 32 will be large and therefore a large voltage will be induced in the output winding. These induced voltages across the output winding may readily be detected by appropriate circuitry as is known in the art.

In practice it is known that the windings may be limited to but one turn, and thus the wires may merely be threaded through the cores rather than wound upon them. Further when the cores are arranged in a matrix or array, only one core is generally switched at one time, so that it has become common to employ only one read-out wire threading each of the cores in succession. Then by reading out or sensing any one core the resultant voltage on the output wire is indicative of the state of the core being sensed.

From the above it is apparent that the problem of the prior art is basically one of selecting the proper core of the matrix for the application of the storage or read-in pulse and the sensing or read-out pulse.

In the prior art the selection problem has been solved by arranging the cores in a square, or a rectangular, matrix and having two input wires thread each core. One input wire threads all the cores horizontally in a given row and one input wire threads all the cores vertically in a given column. Thus in an $n$ x $n$ core matrix there are but $2n$ input wires for storage and sensing of information. This structure assumes that the hysteresis loop of the magnetic material be close to the ideal rectangular loop desired. In practice however the materials do not have ideal rectangular hysteresis characteristics; the materials generally have loops more closely resembling that shown in Fig. 2. In the ideal case the ends have zero slope and the sides an infinite slope, whereas in the actual materials the ends have slopes greater than one and the sides have large but finite slopes. Various techniques have been suggested for correcting these loops or improving the material, but they have tended unduly to increase the complexity of what is basically a very simple structural unit.

Turning now to Fig. 2 we can depict the major problem that is encountered when two lead-in wires thread each core and have applied to them one-half the current required for storage or sensing. If we consider a sensing current as applied to a particular horizontal and vertical wire, a magnetizing force $H_s$ will be applied to the core where those two wires intersect. But to each other core in the same row as the horizontal wire or in the same column as the vertical wire there will be applied a magnetizing force of one-half $H_s$ which, on removal, will cause those materials to traverse a smaller hysteresis loop from point 33 to point 35. If now we consider a single core in a row having a binary digit "1" stored in it by being at point 33 and assume that we want to sense or read-out successively digits stored in the other cores in that row without affecting the storage of the binary "1" in this core, we see that with each successive application and removal of the one-half $H_s$ to this core, it traverses a portion of a small hysteresis loop going from point 33 to 35, then from point 35 to point 36, etc., each time approaching the axis. With each application of the disturbing field $\frac{1}{2}H_s$ the residual induction B of this core is decreased, finally approaching or converging on a limiting value indicated by point 40 after an infinite number of applications of the disturbing field $\frac{1}{2}H_s$. If the distance from point 33 to point 40 is small compared to that from point 33 to the origin, then it is apparent that any number of disturbing voltages may be applied without seriously affecting the information stored in the core by being at point 33. However if the distance from point 33 to point 40 is not negligible in terms of the overall distance, then the effect will be to diminish the residual induction of the core so that it no longer can be read out properly.

There is also a second difficulty. Not only will this repeated application of the partial disturbing field prevent the individual core from giving a proper response when it is sensed, but also the signal induced in the single read-out wire threaded through all cores will be affected by the slight change caused by the disturbing fields thus generated in these non-selected cores. The sum of these small effects may add up to such a value as entirely to mask the proper signal read-out from the sensed core.

Figure 3:
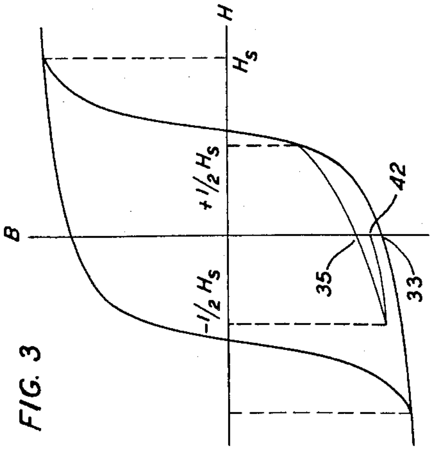

One proposal of the prior art to alleviate these problems can be readily seen in Fig. 3. This proposal is to apply a negative field of the same magnitude as the positive read-out field to each wire every time it is used for selection purpose. Then the small resultant hysteresis loop due to the disturbing fields will continue from point 35 back to point 42, which can easily be seen on Fig. 3 to be closer to point 33 than point 35. However this may considerably complicate the operation of the storage system and its associated circuits and still requires that the core material be chosen with great care, with very slight variations in the properties of the different cores, and with very exacting control on the amplitude of the selection pulses. Other prior art suggestions include applying current to the two wires intersecting the core to be sensed so that each generates the partial disturbing field $\frac{1}{2}H_s$ and applying varying negative currents to non-selected wires to effect a cancellation of the disturbing field in the non-selected cores. Another suggestion of the prior art is to use a number of wires but to apply different currents, both positive and negative. Obviously in these systems it is necessary that any one wire have a number of different currents applied to it of different polarities depending on the particular wires chosen for sensing a given core.

In accordance with another aspect of this invention erroneous and undesirable effects due to disturbing fields are rendered negligible without unduly complicating either the physical structure of the matrix or the associated circuitry by threading each core with a number of wires and by applying to each of these wires threading the core to be sensed an equal positive current. Thus if there are $m$ wires threading each core, a disturbing field $H_s/m$ will be applied to the other cores. A suitable value for $m$ will depend in part on the number of cores and on the material of the core, as described at some length below. In terms of the hysteresis loop of Figs. 2 and 3 it can readily be seen that if $m$ is any number greater than two, such as four or eight, the small hysteresis loop generated by the disturbing voltage $H_s/m$ will be such that the residual induction after application of this disturbing field will be very closely the same as the initial residual induction, and this will be true for infinite successive applications of this disturbing field.

We can describe this result by saying that in accordance with an aspect of our invention we increase the ratio between the selecting and the disturbing fields of the system. The ratio of the minimum selecting field to the maximum disturbing field in any system we shall designate the "selection ratio" and denote it by the letter $p$. We can consider that $m$, the number of wires threading each core as discussed above, is equal to $p$. Then it may be assumed that if at any time some core is being subjected to a selecting field H, no other core is being subjected to a field of more than $H/p$, it being understood that, as taught further below, no two wires will intersect at more than one core. Obviously the greater the value of $p$ the better the convergence in the disturbed cores, and in fact if $p$ is large enough materials whose hysteresis loops only poorly approximate rectangles, can be employed.

Figure 4:
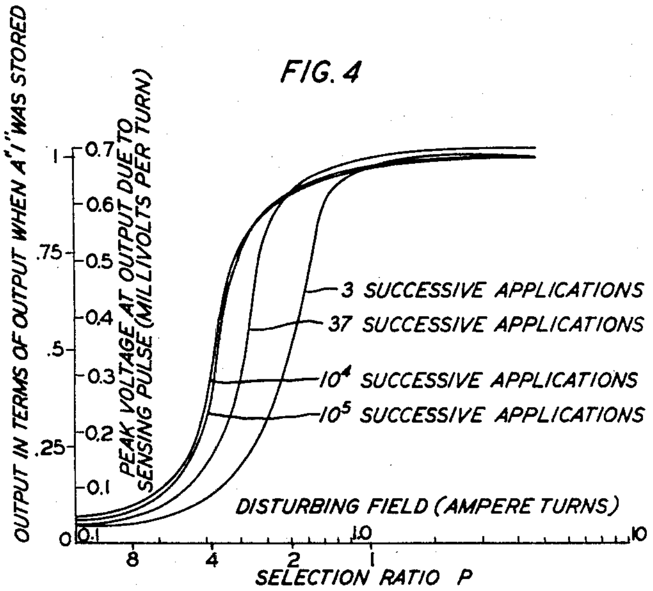
Figs. 4 and 5 are plots of disturbing field due to sensing pulses against peak voltage output for two different magnetic materials and core structures.
Figure 5:
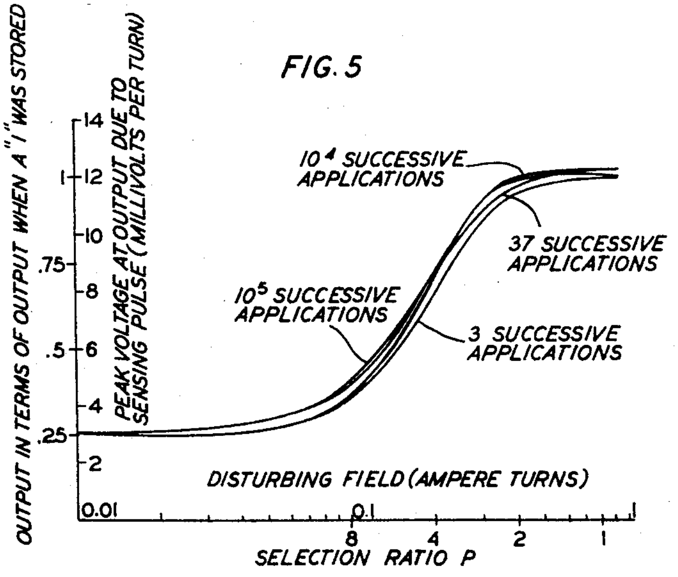

The effect of this aspect of our invention can best be seen, not on a hysteresis loop of the type shown in Figs. 2 and 3, but by means of the graphs of Figs. 4 and 5 which represent tests on two different types of cores. In these two tests a magnetizing field just exceeding the coercive force $H_c$ of the material was applied by a pulse to a core and this was followed by a number $d$ of disturbing pulses of the opposite polarity and magnitude $H/p$, $p$ being varied between 0.1 and 10 and $d$ between 3 and $10^5$. The disturbing pulses were followed by a sensing pulse of the same polarity and magnitude as the initial storage pulse. The voltage of the signal obtained on the output winding upon application of this sensing pulse gives a measure of the effect of the disturbing pulses; the larger the voltage, the greater the effect. For an ideal core material, that is, one whose hysteresis loop was perfectly rectangular, this output signal should be zero for $p>1$ and a constant not equal to zero for all values of $p<1$.

The data depicted in Fig. 4 was taken on a magnetic core comprising a 0.5 inch diameter toroid with 2½ wraps of 0.001 inch Deltamax material; Deltamax is a grain-oriented 50% nickel-iron alloy of the Allegheny Ludlum Steel Corporation. The pulses were of 150 microsecond duration with a 10 microsecond rise and decay; the sensing pulse amplitude was 1.25 ampere turns. The data is plotted in terms of the disturbing field, in ampere turns, on a logarithmic scale and the output voltage, in millivolts per turn. However the values we are interested in are the distinction between the output pulse when a "1" has been stored and when a "0" has been stored but disturbing pulses applied and the selection ratio $p$; the axes have therefore also been calibrated in terms of this ratio and $p$. Four curves are shown for 3, 37, $10^4$, and $10^5$ successive applications of the disturbing field before sensing the core. As can be seen with a selection ratio of but 2, the erroneous output after 3 successive applications of the disturbing field is slightly less than half the output on sensing a stored "1"; however for 37 or more successive applications of the disturbing field the erroneous output is almost nine-tenths the output on sensing a stored "1."

With a selection ratio of 4 however the worst erroneous output is less than four-tenths the correct signal. This may be a sufficient margin for accurate and positive discrimination between a correct signal for a stored "1" and an erroneous signal for a stored "0."

The data plotted in Fig. 5 was taken employing a magnetic core of the type depicted in Fig. 1 wherein the core is defined by a 0.0625 inch hole in a 0.0005 sheet of 4–79 Permalloy material. The pulses were again 150 microseconds in duration with a 10 microsecond rise and decay, and the sensing pulse amplitude was 0.8 ampere-turns. As on Fig. 4 the disturbing field in ampere-turns is plotted logarithmically against the output voltage in millivolts per turn, but the axes are also calibrated in terms of the selection ratio $p$ and the ratio of a correct signal for a stored "1" to incorrect for stored "0's." As can be seen there is a very rapid convergence of the four curves of this graph. The sensing pulse current employed in taking this data was not optimum; one distinction between holes and toroids as magnetic core elements is that with holes there is a very large range of currents that may be employed to saturate the magnetic region of the hole. This is further discussed below with particular reference to Fig. 8. For the particular sensing current employed a larger selection ratio would be needed than for an optimum current. However this curve is indicative qualitatively of the types of curves for these data and shows the high degree of convergence of the curves for this material.

When additional wires are introduced into the matrix so that each core is threaded by $p$ wires to each of which is applied only $1/p$ the current necessary to generate the total selecting field H, it is apparent that no two of these wires which thread one core should also jointly thread any other core. Further these wires must all intersect the individual cores in such a manner as to have the fields generated thereby additive. Thus in systems in accordance with aspects of this invention there is no cancellation of disturbing fields as we have discovered that such is not required in embodiments of our invention. When the number of cores in the matrix is other than very small it is quite difficult to determine merely from inspection how many wires can be employed and which wires are permissive. However we have established relatively simple criteria on array structures to resolve this.

Figure 6:
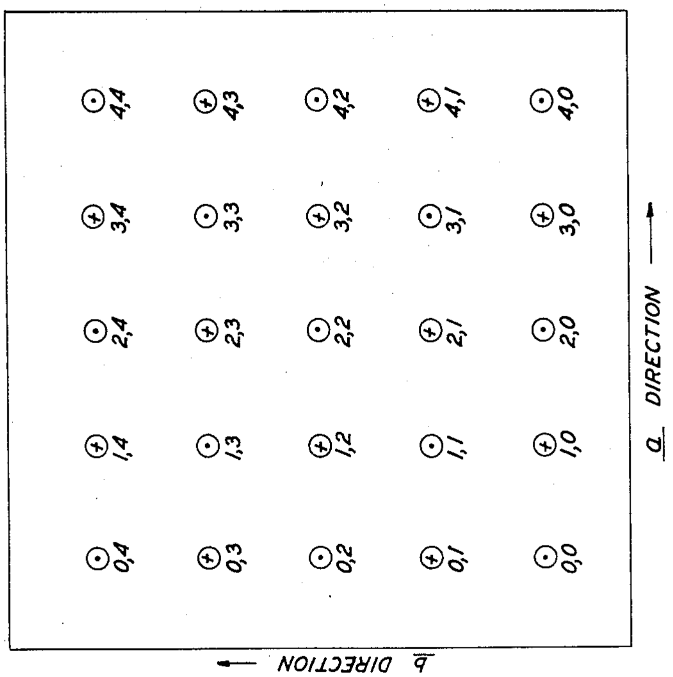
Fig. 6 is a simlified plan of a core matrix.

In Fig. 6 there is depicted a matrix of magnetic cores which we shall presently consider to have no wires threading any of the cores. This matrix is actually that of the embodiment of the invention depicted in Fig. 1 having five cores on the side and with the cores defined by holes, as discussed above. But our discussion at the moment will be concerned only with magnetic cores whether defined by holes or toroids and also shall be generalized to the case of an $n$ by $n$ matrix. As seen in Fig. 6 the cores are arranged in columns in the $b$ or vertical direction and in rows in the $a$ or horizontal direction.

We shall discuss these structural criteria in terms of modular arithmetic and specifically in terms of arithmetic to the modulus $n$; this means that the present arithmetic is limited to those integers from 0 to $n-1$ only; any integer which is a multiple of $n$ is 0 in accordance with the known technique of modular arithmetic and any integer greater than $n$ but not a multiple thereof must be reduced by $kn$, where $k$ is a suitable integer, to find its value in this arithmetic. Thus in the example depicted in Fig. 6 this arithmetic is limited to the integers 0, 1, 2, 3, and 4.

Each of the magnetic cores in the matrix of Fig. 6 is identified by its location in the matrix, the numerical identification in terms of its position along the two axes being written adjacent to it.

It is apparent that two sets of wires which satisfy our conditions are the wires which thread only the cores in a single row or column; these wires are shown in Fig. 7A each connected to a pulse source 45 which applies a current pulse $1/p$ times the desired storage or sensing current. In order to consider what other wires are possible and how many are possible, let us think of each wire as a line intersecting $n$ of the cores, which we shall now just consider as points in the matrix of Fig. 6; each point is identified by the ordered pair of numbers specifying its position along the axis. Further since the conditions for any core are the same for any other and because of the modular arithmetic which we shall employ, we may take any core for our consideration and in fact, for simplicity, we shall consider only the wires, or lines, intersecting the core, or point, at the origin. In this discussion we shall consider only lines that can be specified by selecting a point $(a, b)$ where $a$ and $b$ are relatively prime to $n$, and generating the points $(2a, 2b)$, $(3a, 3b)$ . . . to $[(n-1)a, (n-1)b]$; these $n$ points then define the line. It may be noted that the horizontal and vertical wires are not lines under this definition, but we shall assume that the horizontal and vertical wires are always present. Under this assumption it is apparent that the only other wires that can be added to the array are wires representing lines under the above definition.

For example, one straight line through the origin is identified by the points (0, 0) (1, 1) (2, 2) (3, 3) (4, 4) and is of course a diagonal. It should be noted that in going from one point to another a value of $a=1$ and $b=1$ is added to the ordered pair of numbers defining the prior point. We shall therefore say that the slope of this line is $\lambda=1$. We may define $\lambda$ in general by the expression $a\lambda=b$. This expression has a unique solution for $\lambda$ because $a$ and $b$ are relatively prime to $n$.

In general it should be pointed out that it is possible to define the same straight line by different pairs $(a, b)$; for example, consider lines through the origin for which $(a, b)$ is (2, 1) and (1, 3). The first line contains the points (0, 0) (2, 1) (4, 2) (1, 3) (3, 4) and the second the points (0, 0) (1, 3) (2, 1) (3, 4) (4, 2), and it is obvious that as the two lines contain the same five points they are identical. In both cases the solution of $a\lambda=b$ is $\lambda=3$.

With this background we can set forth the criteria and limitations in accordance with our invention on the number of possible wires that may intersect any single core in the core matrix and the compatibility of the wires in accordance with the essential conditions that each wire intersect $n$ cores but the common to any other wire at only one core. First the number of distinct lines other than the horizontal and vertical lines which contain any particular point in the array is equal to the Euler $\Phi$-function, $\Phi(n)$, which is the number of integers less than $n$ which are relatively prime to it, including 1. Thus the maximum number of distinct lines possible in any array having $n$ cores on a side is $\Phi(n)+2$. However, the number of distinct lines in an array which are compatible, as set forth above, other than the horizontal and vertical lines, is equal to the least prime factor of $n$ less 1, which can be written $n_0-1$. In the specific example given wherein $n$ is 5, $\Phi(n)=4$ and therefore the maximum number of distinct lines possible is 6. It so happens that for $n=5$, $n_0=5$ and therefore the maximum number of compatible wires other than the horizontal and vertical is also 4, all possible lines being compatible; for $n=5$ then the total number of maximum wires and therefore the maximum number of $p$ is 6. For $n=6$, $\Phi(n)=2$ and $n_0=2$. Accordingly, the maximum number of compatible wires including the vertical and horizontal is the value $p=3$. It is apparent that this value $p=3$ will remain constant for any size of array for which $n$ is an even number. Accordingly, it is advantageous to employ arrays in which $n$ is odd. As pointed out before with reference to Figs. 4 and 5 whether one will use the maximum $p$ wires or not depends on the core material, the desired ratio between correct signals and noise, and the maximum number of possible successive applications of the disturbing field.

Secondly two lines L and L′ which intersect at the origin and have slopes $\lambda$ and $\lambda'$ define wires intersecting at another point if and only if $(\lambda-\lambda')$ is equal to 0, mod $n$ or in other words, two lines whose slopes are defined by the pairs $(a, b)$ and $(a', b')$ intersect at another point if and only if $(ab'-ba')$ is equal to 0, mod $n$. If $(ab'-ba')$ is equal to zero, the lines are identical. Therefore two wires are distinct and compatible in a core matrix if their slopes are such that $(ab'-ba')$ has no common factor with $n$ and is not zero.

The above two essential criteria on magnetic core arrays in accordance with our invention can be established by rigorous mathematical proofs, but the proofs are beyond the scope of the present discussion and not essential to an understanding of the various features of this invention.

Thus far in our discussion of the matrix of Fig. 6 we have been perfectly general with regard to the types of cores employed. However when the cores are defined by holes in accordance with an aspect of this invention there is another essential criterion on the structure of the array. Turning again to Fig. 6 if we assume the presence of the horizontal and vertical wires, seen in Fig. 7A, the wires will thread the holes in this embodiment so that they are going into the holes at one set of holes and emerging from the holes at another set; in Fig. 6 wires entering holes are indicated by crosses and wires emerging from holes by dots. Now consider a wire defined by the points (0, 0) (1, 1) (2, 2) (3, 3) (4, 4), i.e., the main diagonal. In each hole the wire is to be coming up from the plane of the paper. However as the material between holes is solid this is impossible without winding the wire around the edge upon emergence from each hole, which is undesirable. Therefore another criterion for acceptable wires in a storage matrix wherein the cores are defined by holes is that each pair $(a, b)$ characterizing a wire be such that $(a+b)$ is odd. However when an edge of the material is reached, i.e., when the addition of $a$ or $b$ to the numbers $(x, y)$ defining the prior hole will be such that $x+a$ or $y+b$ is a number greater than $n$, the wire need not enter the next hole in the direction opposite to the prior hole but may reenter the matrix sheet through a hole in the same direction as it entered the prior hole.

Designating the wires by their slope pairs $(a, b)$, one is able to follow a wire merely by counting $a$ horizontally and $b$ vertically. Advantageously $a$ and $b$ are made as small as possible to attain the most desirable wiring scheme, as the distance between the successive cores should be as short as possible to economize on wire and prevent an unnecessary number of crossing wires. The connection outside the matrix of the several sections of a particular line can be made in any convenient manner.

Now turning back to Fig. 1, the wires 30 there depicted are actually the wires of four distinct sets of sensing wires and the one read out wire. Thus each hole 21 is threaded by four sensing wires and in this embodiment $p=4$. The holes 27 in the Bakelite covers 23 and 24 enable wires to turn the edge of the magnetic plate 20 to enter a hole in the same direction as they had entered the prior hole in the line. The connections between wires comprising sections of the same line may be made by jumpers connected to the terminals 28, to which terminals the wires 30 are also connected. Similarly the connection to the external circuitry may be made by the terminals 28.

The exact pattern of the wires 30 in the embodiment depicted in Fig. 1 is shown in Figs. 7A, 7B, 7C and 7D, which figures when superimposed on each other give the pattern of Fig. 1. In Fig. 7A, as discussed above, are depicted the two sets of horizontal and vertical wires. In Figs. 7B and 7C are depicted the two other sets of parallel sensing wires threading the cores 21, each wire being connected to a pulsing circuit 45 as is known in the art and each pulse circuit applying ¼ the current desired for sensing a core. In Fig. 7D is seen the single read-out wire which threads all the cores 21 and which is connected to a detector circuit 46 of the type known in the art. It should be noted that even though a particular core is not sensed unless all four sensing wires threading it are energized, any core is completely designated by just the horizontal and vertical wires threading it. The pulsing circuits 45 apply both the first or storage circuit pulses to store information in the array by changing the state of magnetization of the material encompassing the apertures and the second or sensing circuit pulse to read out the information thus stored.

As pointed out above, when the magnetic cores in any array are defined by holes as in the embodiment of our invention depicted in Fig. 1 and in Figs. 7A, B, C, and D, there is an optimum storage and sensing current. This is quite different from the prior art toroidal magnetic cores. In a toroid there is a definite amount of magnetic material distinct to each core and therefore the field required to saturate that material can be ascertained. In a hole type magnetic core however there is an indefinite amount of magnetic material defining the core. For this reason when one applies a larger current pulse to drive this core to saturation, a portion of field generated will actually be applied to magnetic materials further removed from the hole itself and to which no field has been applied by the smaller current pulse. There is therefore an optimum current for storage or sensing a hole type magnetic core. This optimum may also be affected by a proximity effect due to flux couplings of adjacent holes; in fact, this proximity effect can give rise to serious interference with the correctness of the stored information. In the particular embodiment of this invention described above with reference to Fig. 1 the spacing between adjacent holes was sufficient so that no noticeable interference occurred for currents up to twice the necessary amount. However if the holes are too closely spaced together the fringe flux around one hole can act to upset the information stored in an adjacent hole.

There are thus two effects that must be considered in a hole type magnetic core array, the proximity effect and the effect of the disturbing fields, as discussed above. One indication of the effect of the disturbing field is the ratio of the signal output, on storage of a binary "1," to the output on the storage of a binary "0," which we shall refer to as the signal-to-noise or S/N ratio. This ratio is the inverse of the ratio employed as the ordinate in the curves of Figs. 4 and 5. The curves of Fig. 8 depict the signal-to-noise ratio for various sensing currents applied to one hole of the matrix after a single disturbing pulse and after fifty disturbing pulses. From Fig. 5 it is readily seen that the Permalloy sheet through which the holes extend is very near convergence after it has received fifty disturbing pulses, so the lower curve of Fig. 8 may be considered a limiting value. Further the particular two holes utilized for the sensing of information in the taking of this data were adjacent each other, so that any disturbance due to the proximity effect in this specific embodiment is also included in the data plotted in Fig. 8. As can be seen the optimum sensing current is one of the order of 320 milliamperes, or of about 80 milliamperes in each of the four sensing wires threading the hole. With this current the signal-to-noise ratio is approximately 6 even after application of the disturbing pulses. However for other than the optimum current the signal-to-noise ratio drops off quite rapidly. The sensing current employed in taking the data for the curves of Fig. 5 was 800 milliamperes total, or, if four wires are employed, 200 milliamperes in each selecting wire; while this current is not on the graph of Fig. 8 is is apparent that this current will give a very poor signal-to-noise ratio, as already seen and discussed with reference to Fig. 5.

When employing magnetic cores defined by holes in a plate of magnetic material it is desirable to have the signal-to-noise ratio substantially constant for the various holes of the array. Variations in this ratio may be introduced due to work-hardening, tearing, burning, or other damage done to the magnetic material during the forming as by drilling or pulling, of the holes through the magnetic sheet as well as to variations in the material itself introduced during the process of manufacture. These variations can be minimized however by careful drilling of the holes, by annealing following the hole forming operation to remove the effect of the work-hardening, and by building the single sheet of magnetic material of several laminations, thereby averaging out the variations of the magnetic properties of a single lamination. In addition, the rectangular properties of the material may be improved by threading a single wire through each hole in the sheet of magnetic material and annealing the metal from above the Curie point with current present in the wire, as described at page 171 of "Ferromagnetism" by R. M. Bozorth (Van Nostrand, 1951).

While this invention has been described with reference to an array of magnetic core members for storing a single binary bit of information at one time, it will be realized that a group of such arrays may be arranged with partial common control and with independent read-out wires for the storage of messages including a number of binary bits of information.

It is to be understood that the above described arrangements are illustrative of the application of the principles of the invention. Numerous other arrangements may be devised by those skilled in the art without departing from the spirit and scope of the invention.

What is claimed is:

1. An electrical circuit comprising a magnetic member displaying substantially rectangular hysteresis characteristics and having a plurality of holes therein arranged in a coordinate array, a first group of sensing wires threading each hole in a row in the *a* coordinate direction in said array, a second group of sensing wires threading each hole in a column in the *b* coordinate direction in said array, and a plurality of other groups of sensing wires each threading said holes, each wire of said other groups threading successive holes such that the interval between successive holes in the *a* direction plus the interval between successive holes in the *b* direction is constant and odd and no two wires of any of said groups jointly thread more than one of said holes in said array.

2. An electrical circuit in accordance with claim 1 wherein the number of said wires threading each hole is $p$ and further comprising means for applying to each of said wires a current $1/p$ the current necessary to change the magnetic state of the magnetic material encompassing any of said holes.

3. An electrical circuit comprising magnetic means capable of assuming stable magnetic remanence states, said means defining a coordinate array of magnetic core members, a first group of sensing wires threading each of said core members in a row in one coordinate direction, a second group of sensing wires threading each of said core members in a column in the other coordinate direction, a plurality of other groups of sensing wires, each wire of said other groups threading successive core members such that no two wires of any of said groups jointly thread more than one core member in said array, and means for applying to each of said wires of said groups a current $1/p$ the current necessary to change the magnetic state of any of said core members, where $p$ is the number of said wires threading each of said core members.

4. An electrical circuit comprising magnetic means having a substantially rectangular hysteresis characteristic, said means defining a coordinate array of magnetic core members $n$ members on a side, a first group of sensing wires threading each of said core members in a row in one coordinate direction in said array, a second group of sensing wires threading each of said core members in a row in the other coordinate direction in said array, and a plurality of other groups of sensing wires threading each of said core members, the wires of said other groups through any one core member having slopes such that the difference between the slopes of any two of said wires threading said one core member is other than zero or zero, mod $n$.

5. An electrical circuit comprising a magnetic member having displaying substantially rectangular hysteresis characteristics and a plurality of holes therein arranged in a coordinate array $n$ holes on a side, a first group of sensing wires threading each hole in a row in the $a$ coordinate direction in said array, a second group of sensing wires threading each hole in a column in the $b$ coordinate direction in said array, and a plurality of other groups of sensing wires each threading said holes, the wires of said other groups through any one core having slopes such that the difference between the slopes of any two of said wires threading said one core member is other than zero or zero, mod $n$, and each wire of said other groups threading successive holes such that the interval between successive holes in the $a$ direction plus the interval between successive holes in the $b$ direction is constant and odd.

6. An electrical circuit comprising a magnetic member capable of assuming stable magnetic remanence states and having a plurality of holes therein arranged in a coordinate array and a plurality of groups of sensing wires each threading said holes, each wire threading successive holes such that the interval between successive holes in one coordinate direction plus the interval between successive holes in the other coordinate direction is odd and no two wires of any of said groups jointly threading more than one of said holes in said array.

7. An electrical circuit in accordance with claim 6 wherein the number of said wires threading each hole is $p$ and further comprising means for applying to each of said wires a current $1/p$ the current necessary to change the magnetic state of the magnetic material encompassing any of said holes.

8. An electrical circuit comprising magnetic means capable of assuming stable magnetic remanence states, said means defining a coordinate array of magnetic core members, a first group of sensing wires threading each of said core members in a row in one coordinate direction, a second group of sensing wires threading each of said core members in a column in the other coordinate direction, a plurality of other groups of sensing wires, each wire of said other groups threading successive core members such that one and only one wire of each group threads each core, means for applying to each of said wires of said groups a current $1/p$ the current necessary to change the magnetic state of any of said core members, where $p$ is the number of wires threading each of said core members, and means including a wire threading each of said core members for detecting a change in the magnetic state of one of said core members.

9. An electrical circuit comprising magnetic means capable of assuming stable magnetic remanence states, said means defining an array of magnetic core members, sensing wires from at least three distinct groups threading each of said core members such that no two wires of any of said groups jointly thread more than one of said core members, and means for applying equal currents of like sign to one of each of said groups of wires to effect a change in the magnetic state of a particular one of said core members.

10. An electrical circuit comprising magnetic means capable of assuming stable magnetic remanence states, said means defining an array of magnetic core members, sensing wires from at least three distinct groups threading each of said core members such that no two wires of any of said groups jointly thread more than one core member, and means for changing the magnetic state of a selected one of said core members, said means including means for applying currents of like sign to one wire of each of said groups, the total energy thus applied to the selected core member being sufficient to change its magnetic state and an insufficient amount of energy being applied to the other core members to cause erroneous information being present in said array due to change of the magnetic state of the other core members.

11. An electrical circuit comprising magnetic means capable of assuming stable magnetic remanence states, said means defining a coordinate array of magnetic core members, sensing wires from at least three distinct groups threading said cores such that no two wires of any of said groups jointly thread more than one core member in said coordinate array, and means for changing the magnetic state of a selected one of said core members in said array, said means including means for applying equal currents of like sign to one wire of each of said groups.

12. An electrical circuit comprising magnetic means capable of assuming stable magnetic remanence states, said means defining an array of magnetic core members, sensing wires from at least three distinct groups threading each of said core members such that no two wires of any one of said groups jointly thread more than one of said core members, and means for changing the magnetic state of a selected one of said core members in said array, said means including means for applying equal currents of like sign to one wire of each of said groups, and means including a wire threading each of said core members for detecting a change in the magnetic state of one of said core members.

13. A magnetic memory circuit comprising a plate of magnetic material having a substantially rectangular hysteresis characteristic, said plate having a plurality of small holes therein spaced sufficiently apart from each other that the magnetic material encompassing each of said holes defines a distinct magnetic member, and at least a first and a second plurality of sensing wires, each of said holes being threaded by one sensing wire from each of said pluralities and no sensing wire of any of said pluralities jointly threading more than one of said holes with any particular one sensing wire of another of said pluralities.

14. A magnetic memory circuit in accordance with claim 13 further comprising means for applying a first current to certain of said wires to store information by changing the state of magnetization of said magnetic material encompassing said holes and for applying a second current to certain of said wires to read out the information stored in said magnetic material encompassing said holes.

15. A magnetic memory circuit in accordance with claim 14 wherein said plate of magnetic material is mounted between a pair of insulating cover plates having a first group of apertures therein mating with said holes in said plate of magnetic material and a second group of peripheral apertures.

(References on following page)

References Cited in the file of this patent

UNITED STATES PATENTS

| | | |
|---|---|---|
| 1,739,579 | Dowling | Dec. 17, 1929 |
| 2,254,931 | Bryce | Sept. 2, 1941 |
| 2,519,513 | Thompson | Aug. 22, 1950 |
| 2,691,156 | Saltz | Oct. 5, 1954 |
| 2,719,965 | Person | Oct. 4, 1955 |
| 2,724,103 | Ashenhurst | Nov. 15, 1955 |

OTHER REFERENCES

Publication: EDVAC Progress Report No. 2, vol. 2, published June 30, 1946, Moore School of Electrical Engineering, University of Pennsylvania, Philadelphia, Pa.; Figure 17*c*, described on pages 4–23, is relied on.